Dec. 9, 1958 G. E. COMSTOCK 3D 2,863,222
TAPER GAUGING DEVICE

Filed Nov. 4, 1955 3 Sheets-Sheet 1

INVENTOR
GEORGE E. COMSTOCK 3rd.
BY
Harold W. Eaton
ATTORNEY

Dec. 9, 1958  G. E. COMSTOCK 3D  2,863,222
TAPER GAUGING DEVICE
Filed Nov. 4, 1955  3 Sheets-Sheet 2
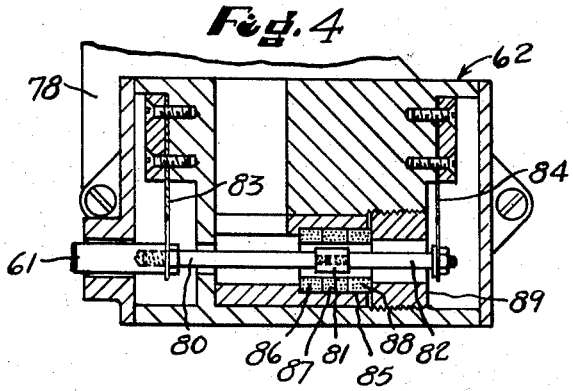
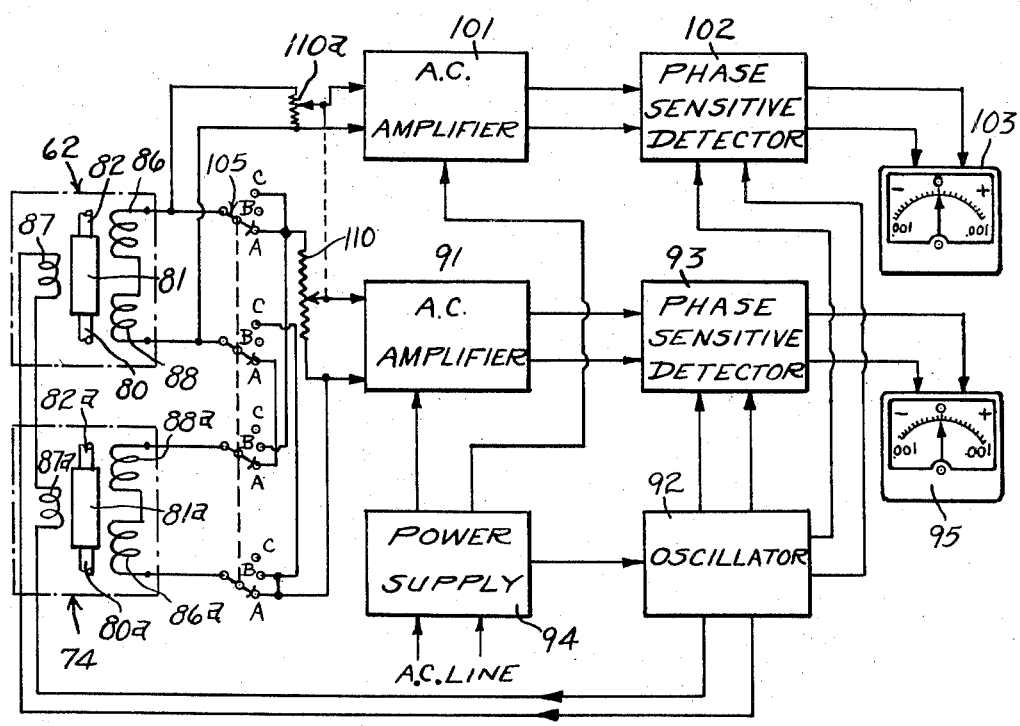
INVENTOR
GEORGE E. COMSTOCK 3rd.
BY
Harold W. Eaton
ATTORNEY

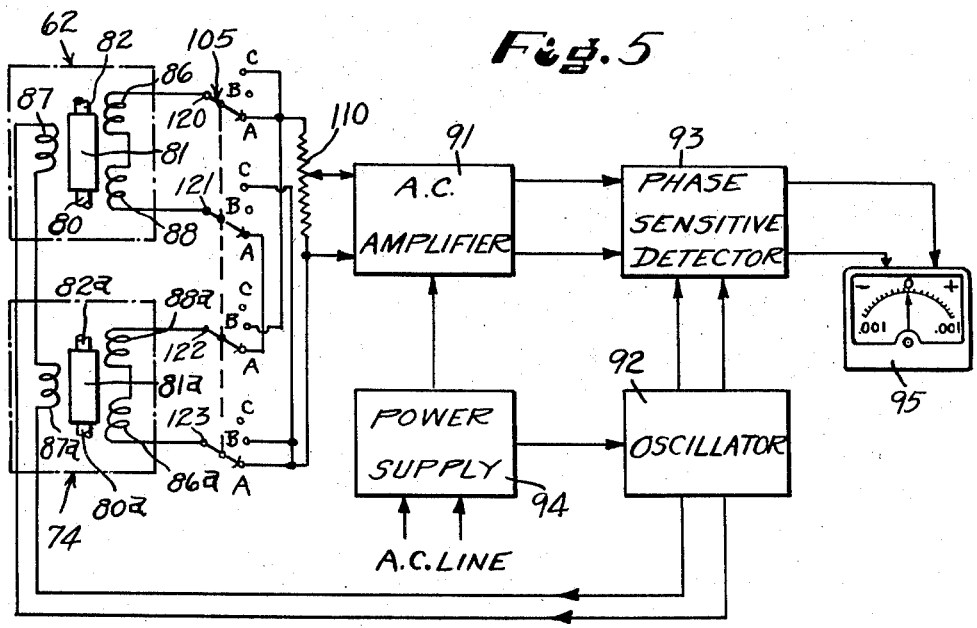

United States Patent Office

2,863,222
Patented Dec. 9, 1958

2,863,222
TAPER GAUGING DEVICE

George E. Comstock 3rd, Princeton, Mass., assignor to Norton Company, Worcester, Mass., a corporation of Massachusetts Application November 4, 1955, Serial No. 544,979

6 Claims. (Cl. 33—174)

The invention relates to gauges, and more particularly to a taper gauging device for precisely gauging tapered work pieces.

One object of the invention is to provide a simple and thoroughly practical taper gauging device. Another object is to provide means for precisely measuring the taper of external conically shaped work pieces. Another object is to provide means by which the difference in taper of a given work piece from that of a standard work piece may be accurately determined as indicated in a single value on a meter. Other objects will be in part obvious or in part pointed out hereinafter.

In the accompanying drawings, in which is shown one of various possible embodiments of the mechanical features of this invention, Fig. 1 is a plan view of the taper gauging device;

Fig. 4 is a vertical sectional view, on an enlarged scale, through one of the pick-up units;

Fig. 5 is an electric diagram; and

Fig. 6 is a modified electric diagram.

Figure 1:
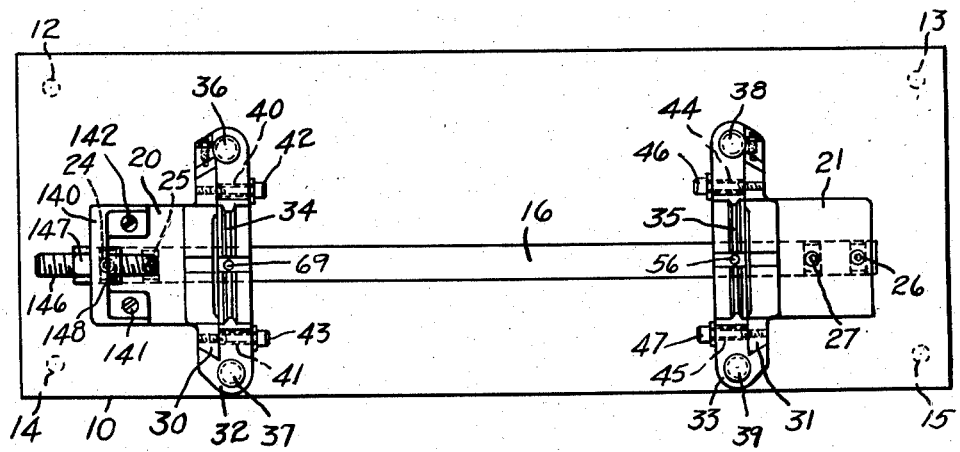

A taper gauging device has been illustrated in the drawings comprising a base 10 having an upper plane working surface 11. The base 10 is provided with a plurality of levelling screws 12, 13, 14 and 15. The upper plane surface 11 of the base 10 is provided with an elongated slot 16 having parallel sides which serves as a guideway or slideway for a pair of angle blocks 20 and 21. The angle blocks 20 and 21 are provided with depending lugs 22 and 23 respectively which are arranged to slide within the slot 16. The angle block 20 is provided with a pair of clamping screws 24 and 25 by means of which the block 20 may be clamped in adjusted position within the slot 16. Similarly the angle block 21 is provided with a pair of clamping screws 26 and 27 to facilitate clamping the block 21 in adjusted position within the slot 16.

The angle blocks 20 and 21 are each provided with vertically arranged dove-tailed slideways 30 and 31 respectively. A pair of vertical slides 32 and 33 are provided with mating dove-tailed slideways which mate with dove-tailed slideways 30 and 31 respectively. The vertical slides 32 and 33 are provided with V-shaped surfaces for supporting and positioning a work piece to be gauged. The vertical slide 32 is provided with a pair of vertically arranged adjusting screws 36 and 37 which are screw threaded therein and arranged to bear against the plane surface 11 to facilitate a vertical adjustment of the slide 32 and the V-shaped surface 34. Similarly the vertical slide 33 is provided with a pair of vertically arranged adjusting screws 38 and 39 to facilitate a precise vertical adjustment of the slide 33 and the V-shaped surface 35.

The slide 32 is provided with a pair of elongated slots 40 and 41. A pair of clamping screws 42 and 43 pass through elongated slots 40 and 41 respectively and are screw threaded into the angle block 20 to facilitate locking the slide 32 in a predetermined adjusted position.

Figure 3:
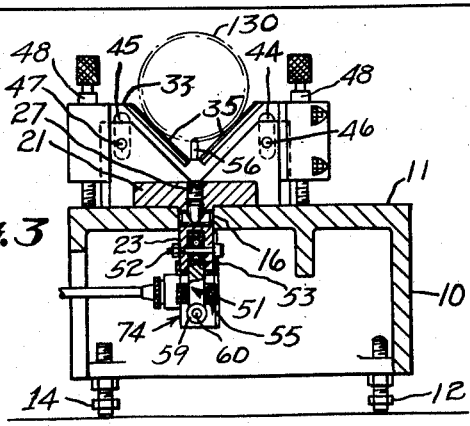
Fig. 3 is a vertical cross sectional view, taken approximately on the line 3—3 of Fig. 2.

The angle slide 33 is provided with a pair of elongated slots 44 and 45 (Fig. 3). A pair of clamping screws 46 and 47 pass through the elongated slots 44 and 45 respectively and are screw threaded into the angle block 21 to facilitate clamping the vertical slide 33 in adjusted position.

A bushing 48 surrounds each of the adjusting screws 36, 37, 38 and 39 respectively and are fixedly mounted in the vertical slides 32 and 33 respectively. The upper portions of the bushings 48 and 49 serve as gauge buttons to facilitate precisely adjusting the positions of the angle blocks 20 and 21 relative to the base to determine the length of the taper to be gauged.

The depending lugs 22 and 23 of the angle blocks 20 and 21 respectively are each provided with a slot 50 within which is mounted bell crank levers 51 and 65 respectively. A stud 52 supported by the lug 23 supports an anti-friction bearing 53 on which is mounted the bell crank lever 51. The bell crank lever 51 is provided with a horizontally extending arm 54 having a vertically arranged adjusting screw 55, the upper end of which is formed as a vertical rod 56 passing through a clearance hole 57 formed in the vertical slide 33. The rod 56 is positioned so that its axis bisects the angle of the V-shaped surface 35 and is arranged to engage the lower surface of a work piece supported therein. The adjusting screw 55 is provided with a lock nut 58 by means of which the adjusting screw 55 may be locked in adjusted position.

The bell crank lever 51 is provided with a vertically arranged arm 59 having an adjusting screw 60 which is axially aligned with an actuating plunger 61 of a pick-up unit 62 to be hereinafter described. A flat spring 63 serves normally to urge the bell crank lever 51 in a clockwise direction to maintain the rod 56 in an uppermost position in engagement with a work piece to be gauged.

The depending lug 22 of angle block 20 is similarly provided with a bell crank lever 65 which is supported by an anti-friction bearing (not shown) carried by a stud 66 supported by the lug 22. A horizontally extending arm 67 of the bell crank lever 65 is provided with adjusting screw 68 the upper end of which is formed has a vertically arranged rod 69 which passes through a clearance hole (not shown) formed within the vertical slide 32. The upper end of the rod 69 is arranged so that its axis bisects the angle of the V-shaped surface 34 on the vertical slide 32. A lock nut 70 is provided on the screw 68 to facilitate locking the screw in adjusted position.

The bell crank lever 65 is provided with a vertically arranged arm 71 having an adjusting screw 72 arranged in axial alignment with an actuating plunger 73 of a pick-up unit 74.

The pick-up units 62 and 74 are substantially identical in construction, consequently only the pick-up unit 62 has been illustrated in detail and will be described hereinafter. The pick-up unit 62 is fixedly mounted on a bracket 78 which is in turn fixedly supported on the depending lug 23 of the angle block 21. Similarly the pick-up unit 74 is fixedly supported on a bracket 79 which is in turn supported on the depending lug 22 of the angle block 20.

The actuating plunger 61 of the pick-up unit 62 is connected to the left hand end of a rod 80 of a non-magnetic material. The other end of the rod 80 is fixedly connected to a ferrous metal core 81. A rod 82 of non-magnetic material is connected to the right hand end of the core 81. A flat spring 83 supports the actuating plunger 61 and the rod 80, and a flat spring 84 supports the right hand end of the rod 82. It will be readily apparent from the foregoing disclosure that actuation of the screw 60 serves to move the plunger 61 and the rods 80—82 in an axial direction to impart an axial adjustment to the core 81. The pick-up unit 62 is provided with a cylindrical aperture 85 which is arranged to support a plurality of coils 86, 87 and 88 of a linear variable differential transformer. A sleeve 89 is screw threaded into the right hand end of an aperture 96 and serves to hold the coils 86, 87 and 88 in position. The linear variable differential transformer will be hereinafter referred to as L. V. D. T. It will now be seen that the L. V. D. T. 81—86—87—88 is actuated whenever the screw 60 engages and moves the actuating plunger 61 in an axial direction and the springs 83 and 84 provide a restoring force normally to maintain the core 81 in a central position when the screw 60 is out of engagement with the plunger 61.

The pick-up unit 74 is substantially identical in construction to that just described. The actuating plunger 73 is connected to a rod 80a of a non-magnetic material. The other end of the rod is secured to a ferrous metal core 81a. A rod 82a of non-magnetic material is connected to the other end of the core 81a. A pair of flat springs (not shown) serve as a support for the plunger 73 and the rods 80a—82a. The L. V. D. T. contained in pick-up unit 74 consists of a plurality of coils 86a, 87a, and 88a, Referring now to Fig. 5 a meter circuit with appropriate connections of the L. V. D. T. pick-up units is shown. L. V. D. T. primary windings 87 and 87a are excited from a local oscillator 92 providing a suitable alternating current voltage at a suitable frequency, for example, 6 volts R. M. S. at 10 kilocycles per second, may be employed. It is to be noted that the series connection of primary windings 87 and 87a leads to a common excitation current for the two L. V. D. T. pick-up units which insures more nearly equal sensitivity of the two transducers independent of small variations in primary winding impedance which would effect the relative primary currents in the event of a parallel connection, although the letter may serve adequately for many applications of the taper gauge.

Secondary windings 86 and 88 of the L. V. D. T. of pick-up 62 are connected in series opposing, so that the net output voltage is proportional to the displacement of core piece 81 axially from a symmetrical position between the two coils.

Similarly the secondary windings 86a and 88a of the L. V. D. T. of pick-up unit 74 are connected differentially. The output of secondary windings 86 and 88 is connected to terminals 120 and 121 of a 3 position 4 gang selector switch 105, while secondary windings 86a—88a are connected to terminals 122 and 123 of said selector switch. With the selector switch in position "A" as shown, the difference voltage between the output of the L. V. D. T. of pick-up 62 and the output voltage of the L. V. D. T. of pick-up 74 is connected across a potentiometric gain control 110, the output of which is fed to an alternating current amplifier 91. The amplifier output voltage is fed to a phase sensitive detector 93, as is also a carrier phase reference voltage from the oscillator 92. The output of the phase sensitive detector is a direct current voltage proportional to the in phase componetn of the signal voltage applied to potentiometer 110, and is directed into a D. C. meter 95. Thus the deflection of the needle of meter 95 is proportional to the difference in movement of cores 81 and 81a.

With the selector switch in position "B" only the output of the L. V. D. T. of pick-up 74 is connected to the A. C. amplifier 91, while rotating the selector switch 105 to position "C" connects the output of the L. V. D. T. of pick-up unit 62 to the amplifier 91.

A suitable power supply 94 is employed to provide the necessary potentials for operation of the various amplifiers, oscillators, etc.

The operation of the taper gauging device will now be described.

Figure 2:
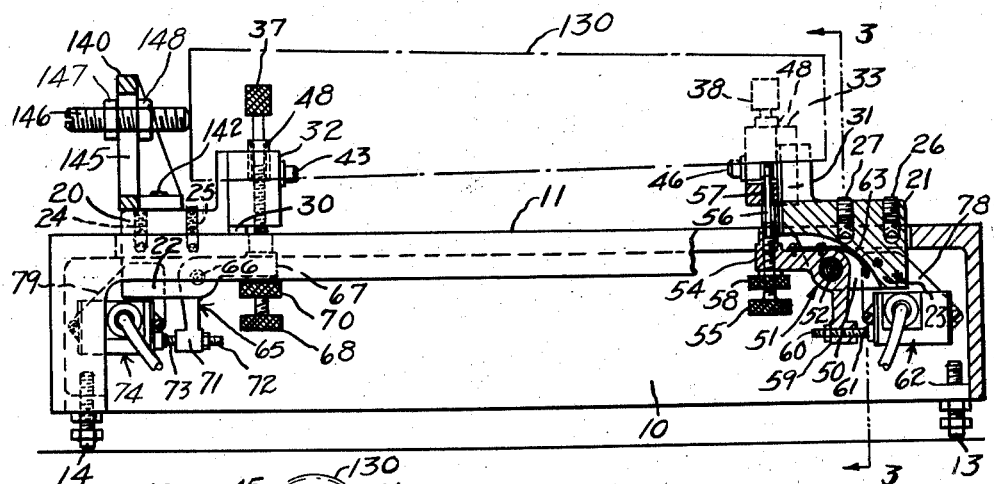
Fig. 2 is a front elevation of the gauging device, having parts broken away and shown in section.

Referring now to Fig. 2 a master taper piece 130 is placed upon the V-blocks 34 and 35. Elevation adjusting screws 36, 37, 38 and 39 are used to place the axis of the taper piece approximately parallel to the upper plane surface 11 of the base 10.

Referring now to Figs. 2 and 5 the distance between V-blocks 34 and 35 is measured, and the potentiometer 110 is adjusted to a position by means of a numbered scale not shown. The calibration of the numbered scale is in inches separation of the V-blocks determined on the basis that full scale deflection of meter 95 corresponds to a given taper difference as determined by a differential displacement of the core pieces of the pick-up 62 and 74 relative to the separation of the V-blocks 34 and 35.

With the selector switch 105 in position "C," thus connecting pick-up 62 to the A. C. amplifier 91, adjusting screw 55 is rotated until its contact rod touches the taper piece, and adjustment is continued until rotation of the crank 51 moves the core piece 81 into its electrical null position as indicated on meter 95.

The selector switch 105 is then set into position "B," and this nulling operation is repeated for pick-up 74 by adjustment of adjusting screw 68.

Selector switch 105 is then placed in position "A," and the meter 95 continues to read zero if the adjustments have been properly made.

Taper piece 130 is now removed from the gauge, and a work piece of unknown taper which is supposed, however, to be equal to the taper of the master taper piece is inserted in the V-blocks 34 and 35 in its place. If the taper of the work piece is the same as the taper of the master piece, then rods 56 and 69 are depressed equal amounts independent of the axial location of said work piece relative to said V-blocks. Thus both L. V. D. T. cores 81 and 81a move equal amounts, and the net differential output voltage of the two pick-ups remains zero resulting in no change in the zero indication of meter 95, showing that the taper of the work piece is indeed the same as the taper of the master piece.

However, in the event that the work piece taper differs from the taper of the master piece, one of the rods 56 or 69 will be depressed further than the other, resulting in a difference in the movement of core pieces 81 and 81a with a resultant output voltage which deflects meter 95 through the action of the amplifier and phase sensitive detecting circuits, the amount of the deflection being proportional to, and calibrated in terms of, the taper error in some convenient units such as thousandths of inches per foot in accordance with the gain setting potentiometer 110 as hereinbefore described. If the work piece differs in taper from the master piece by being small on the right hand end in Fig. 2, its taper is greater than that of the master piece, and the polarity of the circuit connections of Fig. 5 is such that the needle of meter 95 deflects in the positive direction, whereas if the taper of the work piece differs from the taper of the master piece in the opposite sense, the needle of meter 95 deflects in the negative direction.

It must be realized that mechanical and electrical elements are not perfect, and, therefore that the two L. V. D. T.'s of pick-up units 62 and 74 may not be precisely identical in their characteristics, such as sensitivity and linearity. Therefore, it is desirable to insure that the measurements made when the work piece is in position are at approximately the same diameters as the diameters of the master piece in contact with rods 56 and 69 at the time of nulling or zeroing the pick-up units. One method for accomplishing this result is to turn selector switch 105 to either position "B" or position "C" when the work piece is placed in the V-blocks after removing the master piece. The work piece is then adjusted axially until the meter 95 reads zero, thus indicating that the position of the L. V. D. T. of the pick-up unit which is connected to A. C. amplifier 91 is in the same position on the work piece that it occupied when the master piece was in the gauge. Then turning selector switch 105 back to position "A" permits the meter 95 to indicate the taper error as described above.

An alternative method for accomplishing the desired axial positioning of the work piece is illustrated in Fig. 2 in the form of bracket 140 which is mounted on angle block 20 by means of screws 141 and 142. Bracket 140 carries in slot 145 an endwise adjusting stop screw 146, which is held stationary in slot 145 by hex nuts 147 and 148. Placing the master taper piece 130 in the V-blocks with its end resting firmly against stop screw 146, and placing subsequent work pieces in the gauge in the gauge in the same manner insures that the rods 56 and 69 contact the respective pieces at very nearly the same diameters in each case, and therefore, it is not necessary when using stop 146 to perform the axial adjusting operation of subsequent work pieces with the switching operation described above. This latter is applicable only in those cases where the work piece is identical in size and form to the master piece.

Referring now to Fig. 6 an alternative endwise adjusting method is shown in the form of an auxiliary potentiometer 110a coupled to potentiometer 110, potentiometer 110a receiving signal voltage from one and only one of the L. V. D. T.'s. The output voltage from the potentiometer 110a is directed into an A. C. amplifier 101 identical in characteristics to A. C. amplifier 91, the output of amplifier 101 is directed to a phase sensitive detector 102 identical in characteristics to phase sensitive detector 93, and the output current of the phase sensitive detector 102 is directed to meter 103 which is identical to meter 95. Thus meter 103 continually monitors the position of core piece 81 independently of the position of selector switch 105, and therefore serves as a continuous measure of the work piece diameter at rod 56, so that endwise adjustment of the work piece may be accomplished by observing the reading of meter 103, the operator moving the work piece axially until the meter reads zero, at which time, with selector switch 105 in position "A" meter 95 reads the taper error directly.

It will thus be seen that there has been provided by this invention apparatus in which the various objects hereinabove set forth together with many thoroughly practical advantages are successfully achieved. As many possible embodiments may be made of the above invention and as many changes might be made in the embodiments above set forth, it is to be understood that all matter hereinbefore set forth or shown in the accompanying drawings is to be interpreted as illustrative and not in a limiting sense.

I claim:

1. A taper gauge comprising a base, a pair of spaced adjustable supports on said base to support a work piece to be gauged, a movable work engaging plunger associated with each of said supports, means to adjust the position of said supports longitudinally relative to said base, means to adjust the position of said supports vertically relative to said base to position the axis of the taper to be gauged so that the supports and plungers lie in planes substantially normal to the axis of the work piece to be gauged, electro-mechanical position sensitive modulation means including a pair of spaced linear variable differential transformers each having movable cores, adjustable connections between said plungers and said cores, and a meter operatively connected therewith to indicate movement of said plungers so as to produce a visible indication of taper on said meter.

2. A taper gauge comprising a base, a pair of spaced adjustable supports on said base to support a work piece to be gauged, a movable work engaging plunger associated with each of said supports, means to adjust the position of said supports longitudinally and vertically relative to said base, to position the axis of the taper to be gauged so that the supports and plungers lie in a plane substantially normal to the axis of the work piece to be gauged, means including electro-mechanical modulation means including a pair of spaced linear variable differential transformers each having movable cores, adjustable connections between said plungers and cores, and a meter operatively connected therewith to indicate movement of said plungers so as to give a visible indication of taper on said meter.

3. In a taper gauge, as claimed in claim 2 in combination with means including a selector switch arranged in one position to disconnect one of said transformers from the indicating circuit, in another position to disconnect the other of said transformers from the indicating circuit to facilitate independently zeroing said meter, and in a third position to connect both of said transformers to the indicating circuit to give a net differential reading of taper on said meter.

4. In a taper gauge, as claimed in claim 2, in combination with means including a selector switch arranged in one position to disconnect one of said transformers from the indicating circuit while the other transformer remains connected to facilitate a precise axial positioning of the taper work piece being gauged.

5. A taper gauge comprising a base, a pair of spaced adjustable V-block supports on said base to support a work piece to be gauged, a movable work engaging plunger associated with each of the V-blocks, means to adjust said V-blocks and plungers vertically relative to said base, to position the axis of the taper work piece to be gauged so that the V-blocks and plungers lie in planes normal to the axis of the taper piece, means including electro-mechanical modulation means including a pair of spaced linear variable differential transformers each having a movable core, adjustable connections including a pivotally mounted bell crank lever between each of said plungers and cores, and a meter operatively connected therewith to indicate movement of said plungers to produce a visible indication of taper on said meter.

6. A taper gauge comprising a base, a pair of spaced adjustable angle blocks thereon, a vertically adjustable V-block support on each of said angle blocks to support a work piece to be gauged, a movable work engaging plunger on each of said blocks, means precisely to adjust said V-blocks vertically relative to the angle blocks, said V-blocks serving to engage a taper work piece at spaced portions, means including electro-mechanical modulation means including a pair of spaced linear variable differential transformers each having a movable core, adjustable connections between said plungers and cores, a meter operatively connected therewith to indicate movement of said plungers to produce a visible indication of diameter adjacent to one end of a taper work piece, at one of said plungers on said meter to facilitate axially positioning the taper being gauged, and a second meter operatively connected to indicate movement of said plungers so as to produce a visible indication of taper.

References Cited in the file of this patent

UNITED STATES PATENTS

| 2,016,420 | Engst | Oct. 8, 1935 |
| 2,326,427 | Bickel | Aug. 10, 1943 |
| 2,361,788 | Neff | Oct. 31, 1944 |
| 2,417,148 | Wright | Mar. 11, 1947 |
| 2,478,391 | Segerstad | Aug. 9, 1949 |
| 2,531,317 | Baney | Nov. 21, 1950 |
| 2,600,550 | Levesque | July 17, 1952 |
| 2,627,119 | Graham | Feb. 3, 1953 |

FOREIGN PATENTS

| 712,069 | Germany | Oct. 11, 1941 |
| 750,934 | Germany | Feb. 3, 1945 |
| 608,058 | Great Britain | Sept. 9, 1948 |

OTHER REFERENCES

Cleveland Instrument Co., Cleveland 15, Ohio, bulletin 542, page 10.